United States Patent [19]
Pike et al.

[11] Patent Number: 5,635,264
[45] Date of Patent: Jun. 3, 1997

[54] POSITIONING STRIP AND METHOD FOR POSITIONING FABRIC COVERS ON A FOAM CUSHION

[75] Inventors: William G. Pike, Canton; Richard L. Razey, Harsens Island, both of Mich.

[73] Assignee: Lear Seating Corporation, Southfield, Mich.

[21] Appl. No.: 291,715

[22] Filed: Aug. 17, 1994

[51] Int. Cl.[6] .......................... B68G 7/12; B68G 15/00
[52] U.S. Cl. ..................... 428/43; 428/131; 29/91.5; 112/417; 112/418
[58] Field of Search ............... 428/43, 131; 112/417, 112/418; 29/91.5, 91.7, 91

[56] References Cited

U.S. PATENT DOCUMENTS

| | | | |
|---|---|---|---|
| 4,765,045 | 8/1988 | Seibert et al. | 29/91.1 |
| 4,885,828 | 12/1989 | Kozlowski | 29/9.5 |
| 5,175,916 | 1/1993 | Klems | 29/91.5 |
| 5,362,535 | 11/1994 | Sasaki et al. | 428/43 |

*Primary Examiner*—Alexander Thomas
*Attorney, Agent, or Firm*—Howard & Howard

[57] ABSTRACT

A positioning strip (10) for positioning fabric covers (12, 14) to a cushion (16). The positioning strip (10) includes an extension (26) having a plurality of fracturable fingers (32) extending out therefrom. A detachable portion (38) is secured to all the fracturable fingers (32) at the ends (34) thereof. A notch (44) is formed in each of the ends (34) to insure the fracturable fingers (32) break away from the detachable portion (38) at the ends (34). A flange (42) supports the detachable portion (38) such that the detachable portion (38) maintains the same spatial orientation (through surface (A)) as the extension (26) of the positioning strip (10) is positioned through bends or curves in the design of the cushion (16).

8 Claims, 3 Drawing Sheets

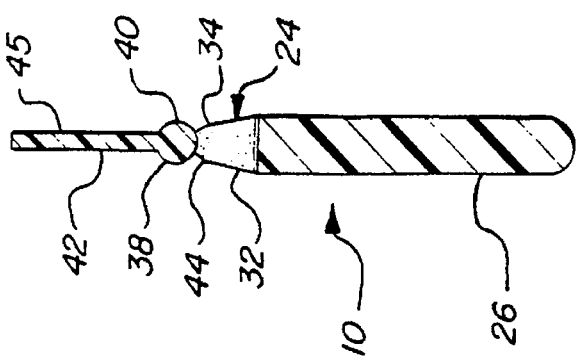
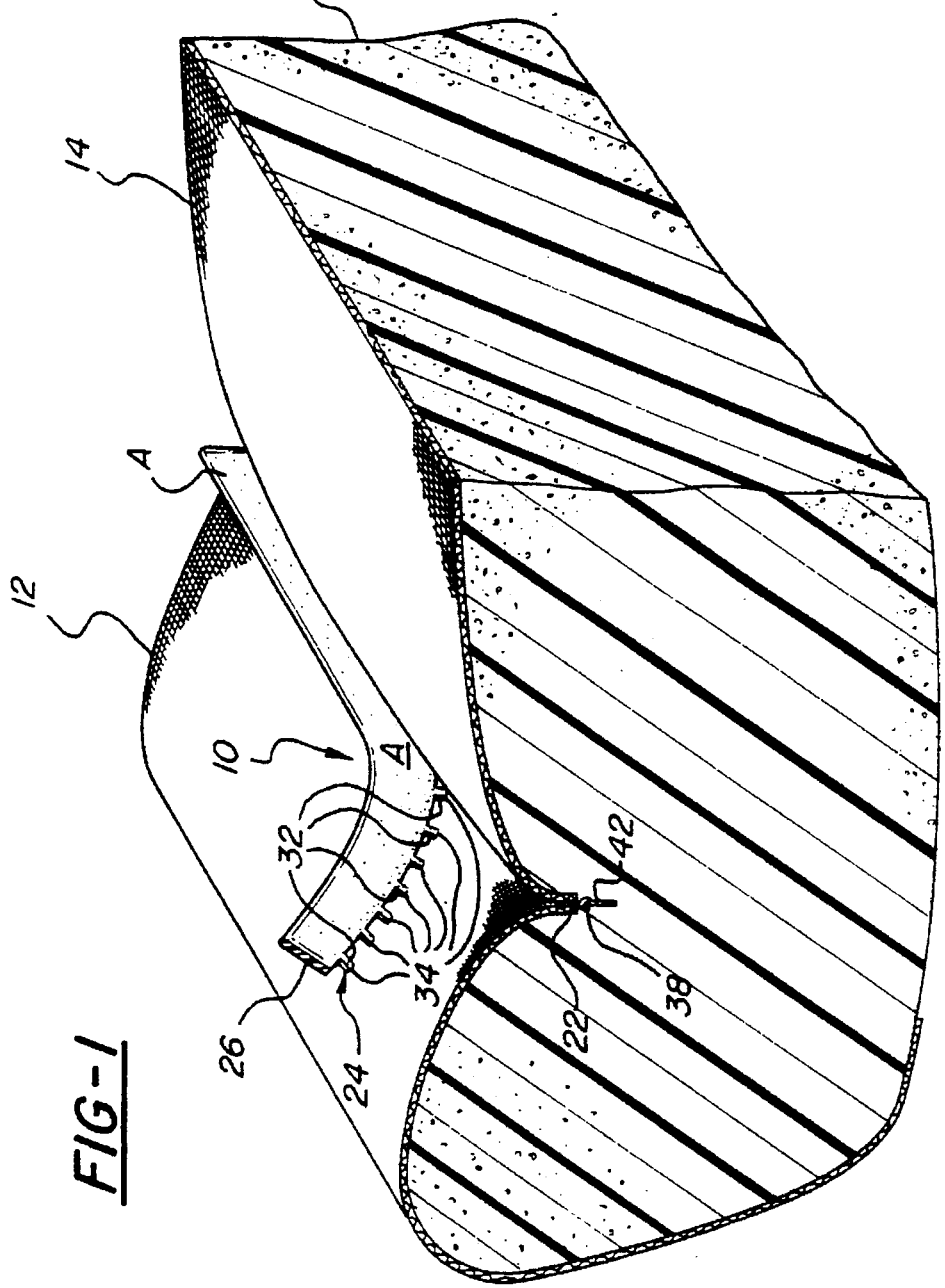

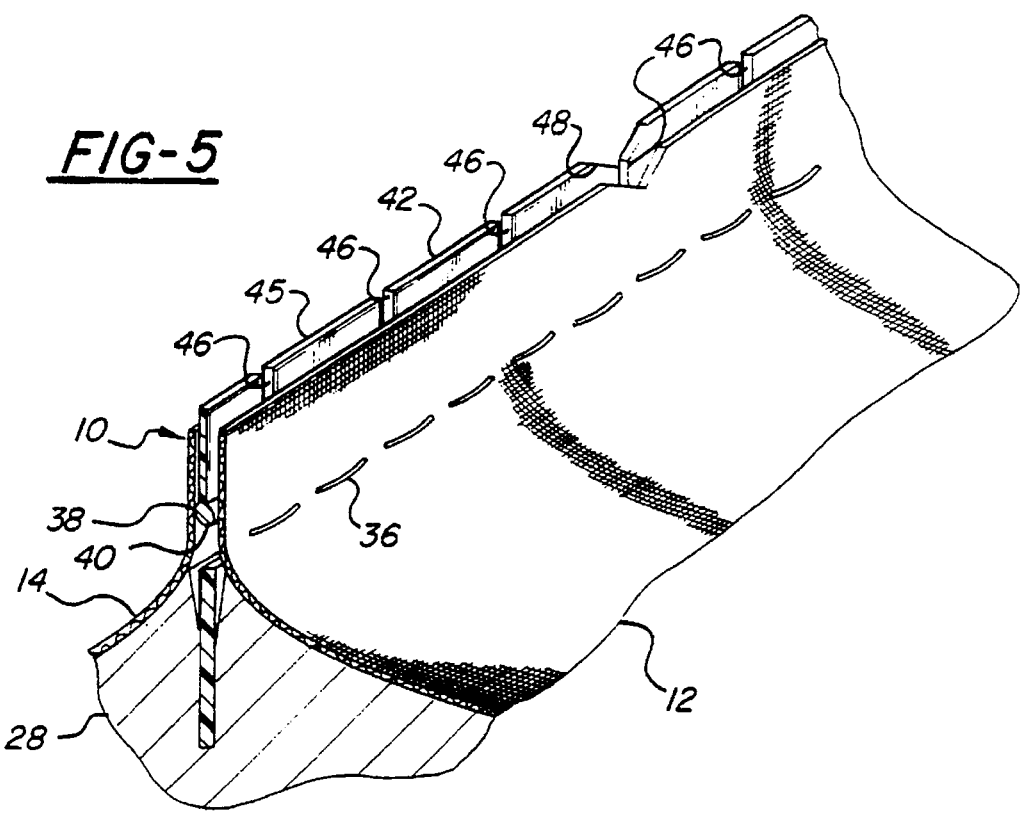
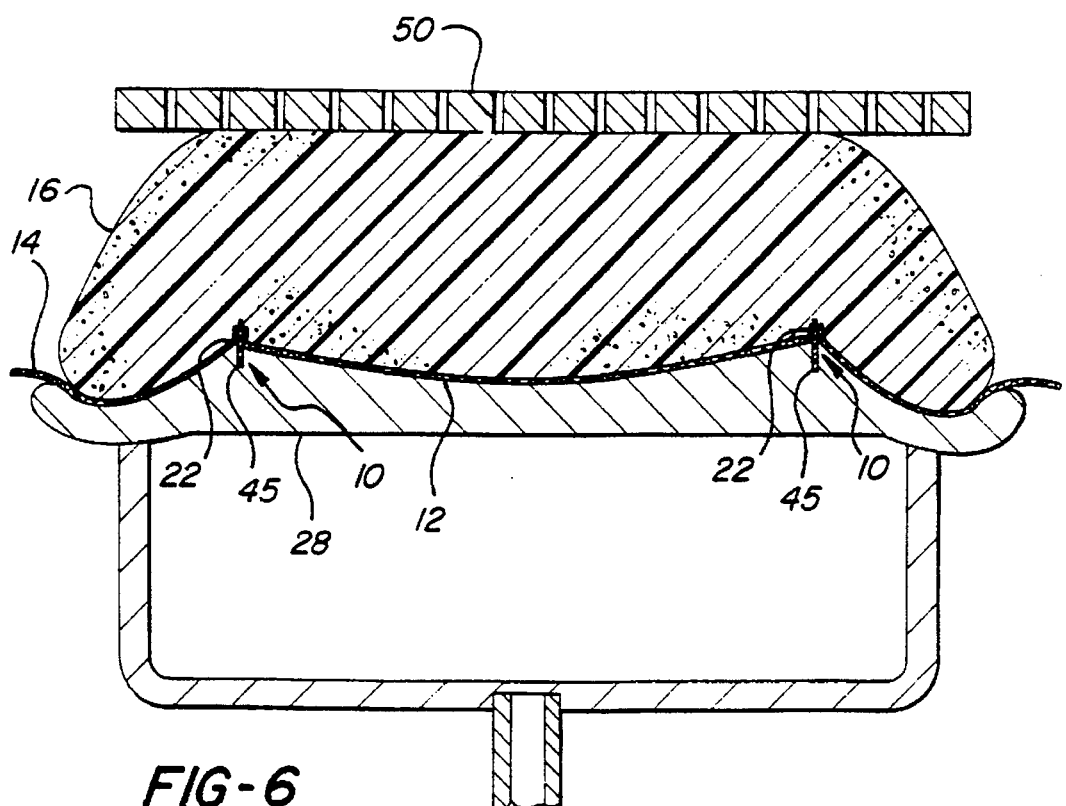

POSITIONING STRIP AND METHOD FOR POSITIONING FABRIC COVERS ON A FOAM CUSHION

BACKGROUND ART

1. Technical Field

The subject invention relates to a method and assembly for upholstering a foam cushion member with two fabric covers, and more particularly to locating the sew seam of the other two covers in a predetermined position from the cushion member.

2. Description of Related Art

The covering of foam cushion members with fabric for use in vehicular seats is commonly performed with automated upholstering equipment. For aesthetic purposes, it is frequently desirable to cover the cushion with two or more fabrics of different colors, patterns, etc., which have been arranged in an attractive fashion. Two or more fabric pieces are generally sewn together along their edges with the sew seam slightly recessed into the cushion for comfort. During the automated upholstering process, however, the fabric covers have a tendency to shift out of proper orientation on the cushion and thus mislocate the sewn seams of the two or more fabrics upon the cushion.

The prior art U.S. Pat. No. 4,765,045 to Allen J. Selbert, issued Aug. 23, 1988, discloses the use of a plastic locator strip which is sewn between two pieces of fabric covering at a sew seam. The locator strip is adapted to be held in an automated tool for positively positioning the sew seam of the two fabrics into the proper orientation on the cushion. After the upholstering process is complete, the locator strip is torn from the fabric by disjoining at a pinched and perforated area thereby leaving a non-removable solid base of a locator strip underneath the sew seam which is permanently embedded in the cushion. The system disclosed includes a deficiency in the upholstering process in that the plastic locator strip must be heated before it is removed from the cushion and portions of the solid base portion, embedded underneath the fabric covers, extend out from the fabric covers during the removal of this locator strip.

The U.S. Pat. No. 4,885,828 to Eric F. Kozlowski, granted Dec. 12, 1989 and assigned to the assignee of the present invention, discloses the use of a similar plastic locator strip for properly positioning upholstery fabric in relation to the seat cushion in the manufacture of a seat. Kozlowski '828, however, teaches the concept of providing a strip which is entirely removable from the seat. Kozlowski discloses a locator strip designed to have these attributes, which strip includes an insertion portion adapted to be inserted between the sewn together edges of the fabric cover. The insertion portion has a plurality of spaced apart, finger-like projections joined together at their distal ends by a thin transverse filament. The fingers and filament define a plurality of openings or pockets for accommodating the stitches of the seat. After the covers have been properly joined to the cushion, the Kozlowski strip is removed by pulling on an extension portion of the strip, causing the sections of filament between the fingers to pull against the stitches and break for intended removal with the remaining portion of the strip.

Although Kozlowski discloses the concept of a completely removable strip, actual use of such a strip has shown that the sections of filament between the fingers offer too great of a resistance to breakage so as to loosen or damage the stitching of the seat when removing the strip. Furthermore, the filament sections have a tendency to break in more than one location leaving the fingers causing small pieces of filament material to remain in the seam which must be removed manually in a separate operation.

The U.S. Pat. No. 5,175,916 to William F. Klems, granted Jan. 5, 1993 and assigned to the assignee of the present invention, discloses the use of a similar plastic locator strip for properly positioning upholstery fabric in relation to a seat cushion in the manufacture of a seat. The plastic locator strip disclosed therein includes a discrete location of detachment. Although this discrete location of detachment, typically a notch or a through-cut, aids in the separation of the detachment means without stringing of the plastic nor destruction of the sewn seams, the detachment means is weakened such that it does not maintain the proper spacial orientation. More specifically, the fingers are bent over as the detachment means naturally acquires the shortest path between two points, especially around corners in the design. The detachment means rests on the cushion adjacent the elongated slot resulting in non-uniform scarred upholstery.

Accordingly, there is still a need in the industry for a locator strip that will not damage the stitching of the seat upon removal nor scar or disfigure the fabric disposed adjacent the locator strip.

SUMMARY OF THE INVENTION AND ADVANTAGES

A positioning strip assembly is disclosed for upholstering a foam cushion member with at least two fabric covers. Each of the fabric covers include edges adapted to be sewn together and received into an elongated slot in the cushion member. The positioning strip assembly comprises an insert adapted to be secured between the edges of the two covers for positioning the edges of the two covers into the elongated slot. An extension extends outwardly in a plane from the insert for receiving a pulling force in a direction away from the insert. The invention further includes detachment means for allowing the extension to unitarily detach from the two fabric covers in response to the pulling force applied to the extension. The invention is characterized by flange means for extending in the plane from the insert for leading the insert into the slot in the cushion member.

The subject invention overcomes the deficiencies of the prior art locator strips by providing novel structure which provides a locator strip which maintains proper spacial orientation while not causing damage to the fabric stitching nor the fabric covers.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the subject locator strip partially detached from an upholstered cushion;

FIG. 3 is cross-sectional end view of the locator strip taken along lines 3—3 of FIG. 2;

FIG. 5 is a perspective view of the locator strip sewn between the edges of the two fabric covers and supported in the upholstery tool; and FIG. 6 is a cross-sectional view of an automated upholstering installation including two locator strips positioning three fabric covers on a cushion.

DETAILED DESCRIPTION OF THE DRAWINGS

Figure 2:
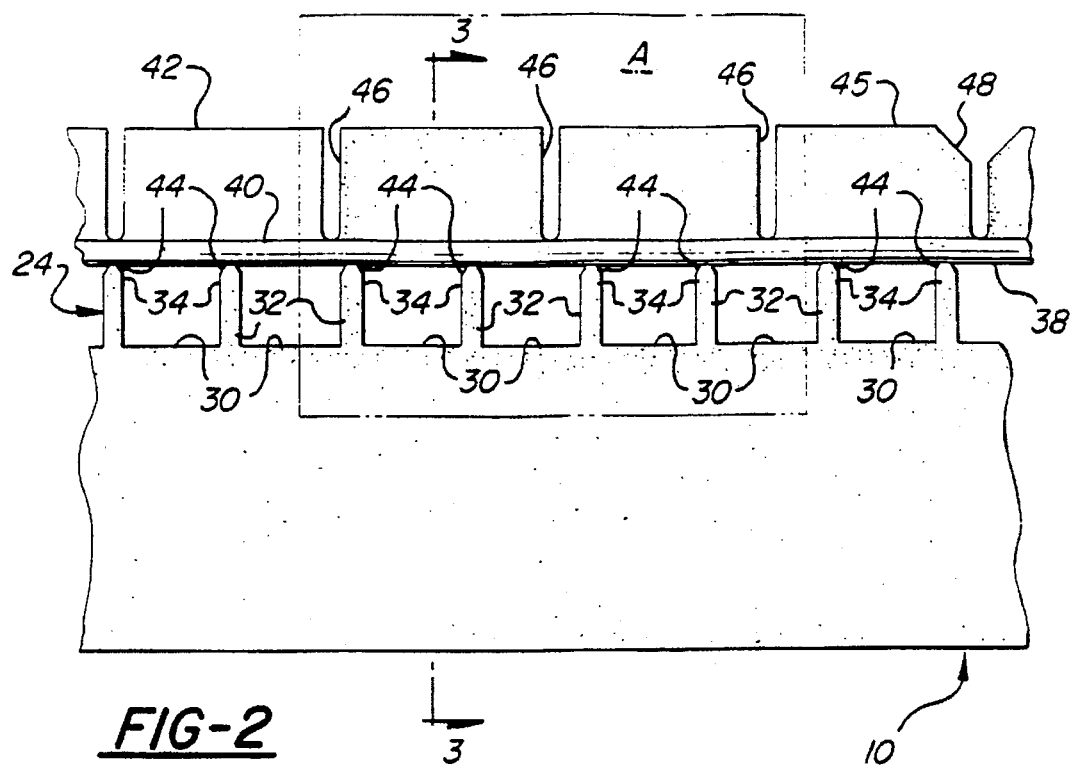
FIG. 2 is a front view of the subject locator strip.

Referring to the Figures, the locator strip assembly is generally shown at 10. The locator or positioning strip 10 is particularly adapted for positioning two fabric covers, generally indicated at 12 and 14 in FIGS. 1, 5 and 6, upon a foam seat cushion 16.

Preferably, the fabric covers 12, 14 are different colors or patterns to present an aesthetically attractive upholstered vehicular seat. Respective edges 18, 20 of the covers 12, 14 are adapted to be sewn together, with the sew seam deposited in an elongated slot 22 provided in the cushion 16. In this manner, the loose edges 18, 20 are embedded in the cushion with the two covers 12, 14 extending laterally from the sew seam leaving an attractively upholstered cushion 16.

The positioning strip 10 includes insert means, generally indicated at 24, in FIGS. 2–6, which is adapted to be secured between the edges 18, 20 into the slot 22 in the cushion 16. As best shown in FIG. 5, the insert means 24 is sewn, or stitched, between the edges 18, 20 of the two covers 12, 14 at the same time as the two covers 12, 14 are sewn together.

Figure 4:
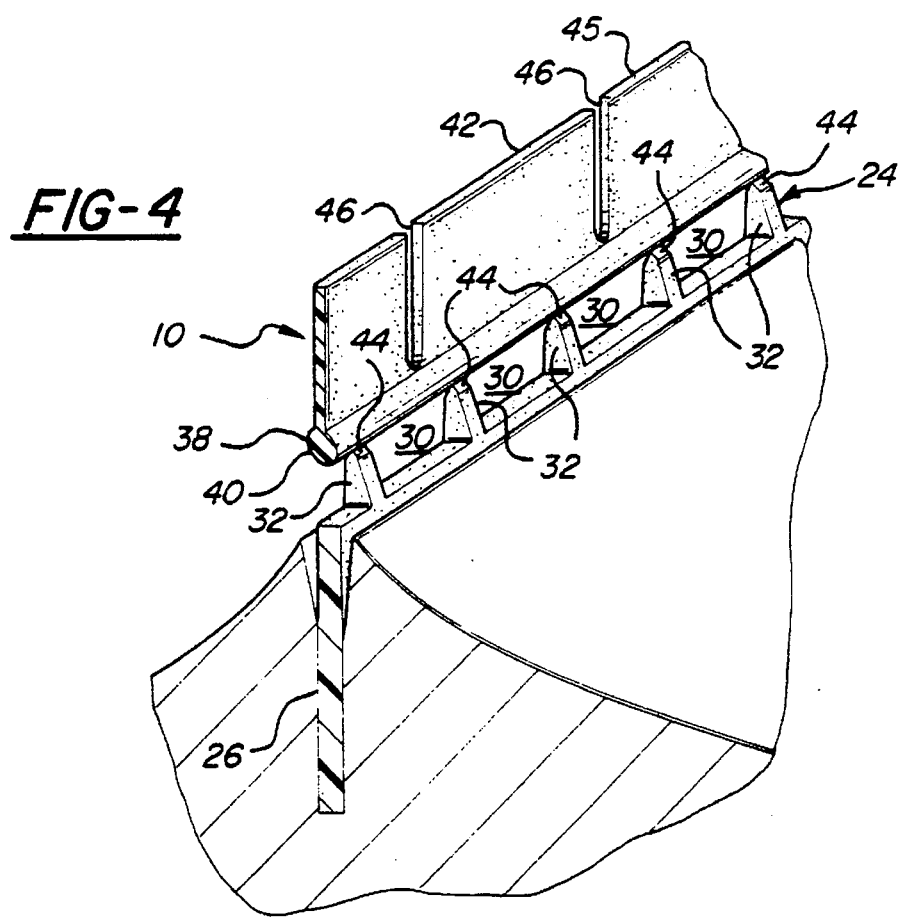
FIG. 4 is a perspective view of the locator strip supported in an automated upholstery tool.

Extension means, generally indicated at 26, defines a plane or surface A and extends outwardly from the insert means or insert 24 for receiving a pulling force in a direction away from the insert 24. As shown in FIGS. 4 and 5, the extension means 26 is also adapted to be supported in an automated upholstering tool 28 movable toward and away from the cushion 16 during the automatic upholstering process, as will be described in greater detail subsequently. The extension means or extension 26 has a generally flat rectangular cross-section with rounded edges. The extension 26 extends longitudinally along the positioning strip 10.

As best seen in FIGS. 2 and 4, the insert 24 includes an array of pockets 30 opening in a direction away from the extension 26. Each adjacent pocket 30 is separated by a fracturable element 32 which extends from the extension means 26 to a distal end 34. The fracturable elements 32 are approximately one sixth (⅙) of the longitudinal span of the pockets 30.

Each of the pockets 30 form empty spaces through which a thread 36 can pass in order to stitch the two covers 12, 14 together. That is, each time the thread 36 passes between the two covers 12, 14, it forms a discretely fastened location. The array of stitches, therefore, form a plurality of spaced discretely fastened locations which are always within the pockets 30. The thread 36 never passes through the locator strip 10, but around the fracturable elements 32 and through the open pockets 30. As will be appreciated, between each fasten location where the thread 36 passes between the two covers 12, 14, void segments, or unfastened areas, are created. The fracturable elements 32, therefore, extend through some or all of these void segments. That is, because the distance between the adjacent fastened locations of the thread 36 may vary, more or less than one fastened location may be disposed through any one pocket 30.

The insert 24 includes detachment means, generally indicated at 38, for allowing the insert 24 to detach from the two covers 12, 14 in response to a pulling force applied to the extension 26. In other words, the detachment means 38 remains in the elongated slot 22 while the rest of the positioning strip 10 is removed in one piece from the two covers 12, 14 and the cushion 16.

The detachment means comprises a transverse element 40. The element 40 resembles an elongated filament of substantially constant cross section fixedly attached adjacent the distal ends 34 of the fracturable elements 32 to enclose the pockets 30 and fully surround the fastening locations where the two covers 12, 14 are sewn together. The diameter of filament 40 is approximately one sixteenth (1/16) the longitudinal span of the pockets 30 and approximately one third (⅓) the longitudinal span of the fracturable elements 32.

The filament 40 is disposed on the opposite side of the sew seam from the extension 26 so that as the extension 26 is pulled to detach the positioning strip 10 from the sew seam and the filament 40. The filament 40 remain on the opposite side of the sew seam after the extension means 26 is removed.

The invention is characterized by a flange means 42 for supporting the detachment means or detachment portion 38 such that the detachment portion 38 maintains a spatial orientation within the surface A and substantially identical to the spatial orientation of the extension 26.

The flange means 42 includes a flange of material 45 extending in the surface A. The flange of material 45 may include a plurality of cuts 46 which are spaced from each other. The plurality of cuts 46 allow the flange of material 45 to be bent to follow the contours of the elongated slot 22 as is required by the particular design of the seat cushion 16. The plurality of cuts 46 extends through the flange of material 45 to the detachment portion 38 and extend perpendicularly out therefrom.

In some instances, the plurality of cuts 46 are not necessary. Therefore, the flange of material 45 is a solid strip of material with spacing indications 48 (discussed subsequently) located therealong.

A multiple of the plurality of cuts 46 include spacing indicators 48 which are also spaced equidistantly over any given multiple of cuts 46. In the preferred embodiment, the spacing indicators 48 extend through every eight cuts 46.

Each of the ends 34 of the fracturable elements 32 include a notch 44. The notch 44 is of lesser strength than all of the other portions of the fracturable elements 32 resulting in the fracturable elements 32 yielding at the notch 44 when a pulling force is exerted thereat to separate the insert 24 from the detachment portion 38. Therefore, all of each of the fracturable elements 32 are removed from the cushion 16 whereas the detachment portion 38 and the flange means 42 remains in the cushion member 16. The break in the fracturable elements 32 is calculated to be at the detachment portion 38 eliminating the possibility of stubs extending out from the elongated slot 22 once the cushion is completed.

Preferably, the subject positioning strip 10 is fabricated from a homogenous organic polymeric material, such as a medium density polyethylene.

Turning now to the preferred method for covering a cushion 16 with fabric 12, 14, the upholstering operation incorporating the positioning strip 10 will be addressed presently. The elongated slot, or groove, 22 is first formed in the cushion 16 in the exact location desired to receive the sew seam between the to covers 12, 14. The positioning strip 10 is then positioned between the edges 18, 20 of the two covers 12, 14. The edges 18, 20 of the two covers 12, 14 are fastened together about the insert 24 of the positioning strip 10 using the thread 36 by passing in and out between the covers 12, 14 in a typical sewing fashion. As mentioned above, the thread 36 passes through the pockets 30 in or out the fracturable elements 32. The pockets 30 are preformed during the manufacture of the strip 10 as are the notches 44 in the fracturable elements 32.

The extension 26 of the positioning strip 10 is then supported in an automated upholstering tool 28 which preferably takes the form of a heatable mold for activating a heat sensitive bonding agent to bond the fabric covers 12, 14 to the cushion 16. As shown in FIG. 6, the cushion 16 may be supported adjacent a suction plate 50 in an orientation facing the tool 28. The tool 28 and the suction plate 50 are then moved toward each other, relatively, until the insert means 24 penetrates the slot 22 in the cushion 16 to exactly position the covers 12, 14 in the cushion 16. The fabric covers 12, 14 are next adhesively bonded to the outer surface of the cushion 16, as described above, or in any other manner well known in the art.

Once the fabric covers 12, 14 have been bonded to the exterior of the cushion 16 as shown in FIG. 1, the seat assembly is removed from the automatic upholstering equipment and the positioning strip 10 remains secure to the sew seam and partially embedded in the groove 22. As soon as the bonding agent between the fabric covers 12, 14 and the cushion 16 have sufficiently cured, the extension 26 and the fracturable elements 32 are removed by applying a pulling force on the extension 26 in the direction away from the insert 24 and the sew seam. With this, the detachment portion 38 remains in the cushion member 16. The fracturable elements 32 are removed by being pulled through the void segments between the fastening thread 36 locations after the fracturable elements 32 have been severed at the notches 44.

The end result of upholstering a cushion 16 by utilizing the subject locator strip 10 results in an attractive and comfortable seat due to the perfectly orientated fabric covers 12, 14 and absence of any scarred or disfigured fabric. The notches 44 also lessen the force required to remove the extension 26 so as to not loosen or damage the stitches of the sewn together covers 12, 14.

The invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

We claim:

1. A positioning strip assembly (10) for upholstering a foam cushion member (16) with two fabric covers (12, 14), each of said fabric covers (12, 14) having edges (18, 20) adapted to be sewn together and received into an elongated slot (22) in the cushion member (16), comprising: an insert (24) adapted to be secured between the edges (18, 20) of the two covers (12, 14) for positioning the edges (18, 20) of the two covers (12, 14) into the elongated slot (22) in the cushion member (16); an extension (26) extending outwardly from said insert (24) and adapted to receive a pulling force in the direction away from said insert (24); fracturable elements (32) responsive to the pulling force on said extension (26) for unsecuring said insert (24) from said extension (26), each of said fracturable elements (32) extending out from said extension (26) to an end (34) secured to said insert (24); and characterized by each of said fracturable elements (32) including a notch (44) at each of said ends (34) which is of lesser strength than all other portions of said fracturable elements (32) to yield due to the pulling force thereat to separate said insert (24) from said extension leaving said insert (24) in the cushion member (16).

2. An assembly (10) as set forth in claim 1 further characterized by said insert (24) including an array of pockets (30) separated by said fracturable elements (32).

3. An assembly (10) as set forth in claim 2 further characterized by including a flange of material (45).

4. An assembly (10) as set forth in claim 3 further characterized by said flange of material (45) including a plurality of spaced cuts (46).

5. An assembly (10) as set forth in claim 4 further characterized by each of said cuts (46) extending through said flange of material (45) from the distal edge thereof to said extension (26).

6. An assembly (10) as set forth in claim 5 further characterized by said plurality of cuts (46) extending perpendicularly to said extension (26).

7. An assembly (10) as set forth in claim 6 further characterized by a portion of said plurality of cuts (46) further including spacing indicators (48).

8. An assembly (10) as set forth in claim 7 further characterized by each of said indicators (48) comprising a notch (44) cut out of said flange of material (42).

* * * * *